(12) United States Patent
Køhler

(10) Patent No.: US 7,168,202 B2
(45) Date of Patent: Jan. 30, 2007

(54) HOOK HOLDER

(76) Inventor: Michael Køhler, Ny Carlsbergvej 23, 5 th./ DK-1760 Copenhagen V (DK)

( * ) Notice: Subject to any disclaimer, the term of this patent is extended or adjusted under 35 U.S.C. 154(b) by 0 days.

(21) Appl. No.: 10/530,834

(22) PCT Filed: Jul. 18, 2003

(86) PCT No.: PCT/DK03/00505

§ 371 (c)(1),
(2), (4) Date: May 31, 2005

(87) PCT Pub. No.: WO2004/032619

PCT Pub. Date: Apr. 22, 2004

(65) Prior Publication Data

US 2006/0048438 A1    Mar. 9, 2006

(30) Foreign Application Priority Data

Oct. 10, 2002    (DK) .............................. 2002 01524

(51) Int. Cl.
*A01K 87/00*    (2006.01)
(52) U.S. Cl. .................... 43/25.2; 43/57.1; 43/43.2
(58) Field of Classification Search ................ 43/25.2, 43/57.1, 43.2
See application file for complete search history.

(56) References Cited

U.S. PATENT DOCUMENTS

| | | | | |
|---|---|---|---|---|
| 2,204,185 A | | 6/1940 | Lougheed ........................ 43/39 |
| 2,514,645 A | * | 7/1950 | Miller ......................... 43/25.2 |
| 3,141,258 A | | 7/1964 | Mayer ......................... 43/57.5 |
| 3,224,134 A | | 12/1965 | Holcombe ................. 43/57.5 |
| D217,663 S | * | 5/1970 | Chamberlain .............. D22/134 |
| 3,540,143 A | | 11/1970 | Zemba ......................... 43/57.5 |
| 3,645,419 A | | 2/1972 | Shorrock ................... 220/31 S |
| 4,121,368 A | * | 10/1978 | Norwood ..................... 43/43.2 |
| 4,667,433 A | * | 5/1987 | Thompson, Jr. ............. 43/25.2 |
| 4,757,637 A | | 7/1988 | Christensen ................ 43/57.1 |
| 4,833,814 A | | 5/1989 | Zygutis ....................... 43/43.2 |
| 4,879,832 A | * | 11/1989 | Nelson ....................... 43/25.2 |
| 5,123,199 A | * | 6/1992 | Lysohir et al. ............... 43/57.1 |
| 5,220,742 A | * | 6/1993 | Lewis ......................... 43/25.2 |
| 5,452,538 A | * | 9/1995 | Trefiak ....................... 43/25.2 |
| 5,535,541 A | * | 7/1996 | Fisher ......................... 43/57.1 |
| 5,761,845 A | | 6/1998 | Bartholomew .............. 43/57.1 |
| 5,992,082 A | * | 11/1999 | Barefoot ..................... 43/25.2 |

\* cited by examiner

*Primary Examiner*—Kurt Rowan
(74) *Attorney, Agent, or Firm*—Cooper & Dunham LLP

(57) ABSTRACT

Hook holder (1) for a hook (4), especially a fish hook, having a shank (5) and one or more curved end (portions) extending from the shank, said hook holder including a container part (2) provided with a cavity (7) for accommodating the curved end portions of the hook, and a container opening (8) through which the curved end portions of the hook are insertable into the cavity. The hook holder further includes retaining means to prevent the hook's curved end portions from unintentionally leaving the container part. The retaining means include a cover part (3) provided with a cover opening (9) and mounted on the container part (2) so as to be movable between a first position, in which the container opening (8) is accessible through the cover opening (9) to allow insertion of the curved end portions (6) of the hook, and a second position, in which the container opening (8) is closed by the cover part (3) to allow the hook shank (5) to project out of the hook holder through the container opening and the cover opening, and the curved end portions are prevented from leaving of the container part. The invention further relates to a hook holder set having a storage unit (27) and a plurality of hook holders (1).

16 Claims, 6 Drawing Sheets

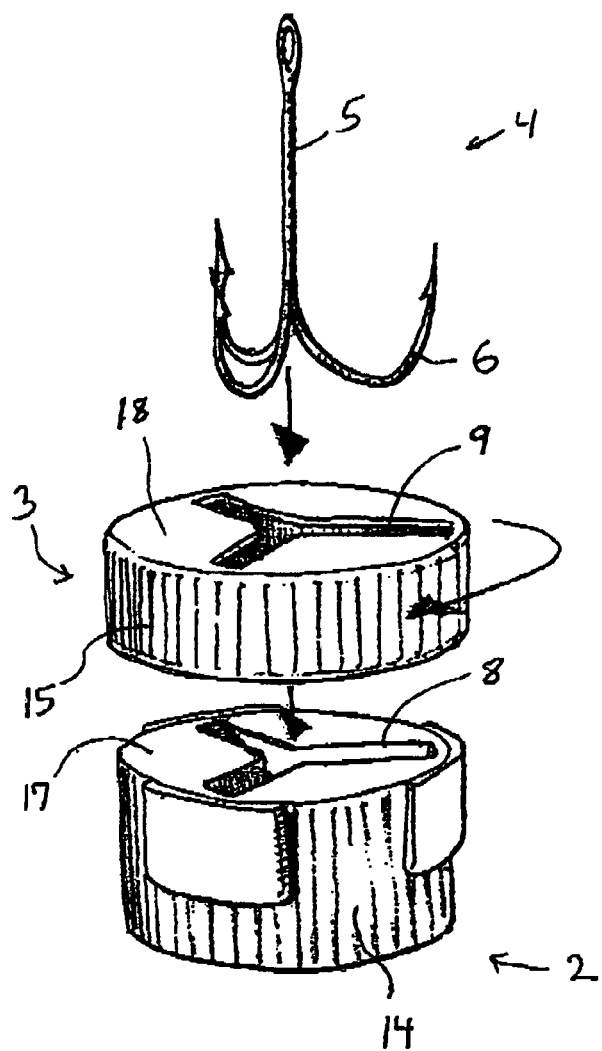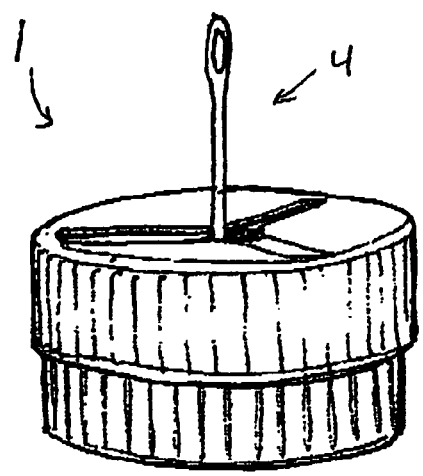
Fig. 1
Fig. 2

HOOK HOLDER

TECHNICAL FIELD

The invention relates to a hook holder for a hook, especially a fish hook, having a shank and one or more curved end portions extending from the shank, said hook holder including a container part provided with a cavity for accommodating the curved end portions of the hook, and a container opening through which the curved end portions of the hook are insertable into the cavity, the hook holder further including retaining means to prevent the hook's curved end portions from unintentionally leaving the container part. The invention further relates to a hook holder set having a plurality hook holders.

BACKGROUND ART

Such a hook holder is known from EP 0 326 626 A1 and is used for encapsulating the pointed end portions of a fish hook, specifically a so-called treble hook including a shank and three curved end portions having points and barbs and extending from the shank. Artificial bait for angling is typically formed of a food-initiating part, which is provided with a fish hook at one end. The fish hook may be a so-called single hook, a double hook or a treble hook. The single hook includes a single curved end portion with a point and a barb, while the double hook includes two curved end portions, which are typical at so-called pirks, where the food-imitating part is formed integrally with the fish hook and where the two curved end portions are arranged at 180° in relation to each other. Artificial baits in form of spoons or spinners often include a treble hook having three curved end portions extending from the hook shank and being arranged at about 120° in relation to each other. Storage of artificial baits in a box involves the well-known problem that the hooks may get tangled up and have to be separated when the individual artificial bait is to be used. This is a time-consuming process and involves a risk of the fisherman snagging himself on the books, in particular when there is insufficient light.

Accordingly various embodiments of hook protection devices have been developed for encapsulating fish hooks during the storage and transportation thereof, said devices being removed when the hook is to be used. With such hook protection devices the hook may also be stored freely in the pocket of the angler's clothing.

The hook holder described in EP 0 326 626 A1 is made of plastics and has a Y-shaped opening with three slots being substantially of the same length and extending radially outwards from a central axis with an interspacing of about 120° and a cavity extending perpendicular into the hook protection device and having a cross section corresponding substantially to the shape of the opening. Adjacent the bottom of each slot of the cavity, small locking projections extend inwardly and behind which the curved end portions of the treble hook may snap into engagement such that the hook protection device is retained on the fish hook. One drawback of this device is that a certain amount of force is required to release the hook from the hook holder, when the snap action of the small locking projections is to be overcome. This involves a risk that the angler injures himself on the fish hook, the hook being jerkily released when pulling force is sufficient strong.

BRIEF DESCRIPTION OF THE INVENTION

The object of the invention is to provide a new and improved hook holder for a hook, especially a fish hook, said hook holder being easily and reliably releasable from the hook.

According to the invention the object is obtained in that the retaining means include a cover part provided with a cover opening and mounted on the container part so as to be movable between a first position, in which the container opening is accessible through the cover opening to allow insertion of the curved end portions of the hook, and a second position, in which the container opening is closed by the cover part to allow the hook shank to project out of the hook holder through the container opening and the cover opening, and the curved end portions of the hook are prevented from leaving the container part. When the container part is in its first position, the curved end portions of the hook may be easily and reliable inserted into the container part, whereafter the cover part may be tuned to the second position, in which the curved end portions of the hook are prevented from sliding out of the container. When the hook is to be removed from the hook holder, the cover part is quite simply returned to the first position, in which the curved end portions of the hook may be reliably removed from the container part. As a result, it is not necessary to pull the hook to overcome a retaining force, the risk of injury caused by snagging on the curved end portions thus being minimised.

According to an advantageous embodiment the container part and the cover part are cylindrical with a common central axis. Such a structure can be made very compact and is easy to manufacture. The common central axis is preferably coincident with the axis of rotation of the cover.

According to a preferred embodiment the container opening and the cover opening are both Y-shaped and provided with three slots of substantially the same length extending radially outwards at an interspacing of about 120°. Such a structure is suitable for accommodating single hooks as well as treble hooks.

According to an optional embodiment the container opening and the cover opening each is provided with an elongate slot extending diametrically through the central axis. Such a structure is suitable for a single hook as well as a double hook having two curved end portions extending from the hook shank at an interspacing of 180°.

According to an embodiment the hook holder includes a pin being securable in the centre of the container opening and the cover opening, respectively, a single hook being arranged with its curved end portion in each slot or slot portion. This embodiment is particularly advantageous in connection with snoods with several single hooks.

According to an embodiment the cavity may be formed as a recess extending perpendicularly into the container part and having a cross section corresponding substantially to the shape of the container opening.

According to a preferred embodiment the hook holder is made of a material or includes a cavity allowing it and an artificial bait provided with a fish hook to float in the water. If an angler drops the artificial bait with a hook holder into the water, it is easily retrieved from the surface.

According to an advantageous embodiment on its cylindrical wall the container part may include outwardly extending projections and the cover part may include inwardly extending projections at the lower end of the cylindrical wall, said latter projections being made to engage the lower face of the projections of the container part, when the cover part is moved from the first position to the second position. The cover part is thus prevented from falling off in its second position, but may be removed and replaced in its first position. The cover part may be replaced by one in a different colour, which may be advantageous, if the angler sorts his hooks according for instance to size, one colour corresponding to one hook size and a different corresponding to a different hook size.

A hook holder according to claim 9 is advantageous in that it is easily grippable for turning the cover part.

The hook holder according to claim 10 is particularly advantageous for retaining several hooks, optionally with artificial bait, the hooks only being released one at a time in a simple manner.

According to an embodiment the hook holder may include a mounting device having a hook holder fastening means and a fishing rod fastening means so that the hook holder may be attached to a fishing rod. As a result a hook or an artificial bait having a hook provided with a hook holder may be secured to the fishing rod, which is advantageous during transportation.

According to a particular simple embodiment the hook holder fastening means and the fishing rod fastening means are formed as substantially C-shaped flexible clamping means.

A hook holder according to claim 13 is advantageous in that it may be turned from its first position to its second position and vice versa using only one hand, the container part or the cover part being fixed in relation to the fishing rod.

The hook holder according to the invention may include a peripherally extending groove in the container part or the cover part.

The hook holder may include a storage unit provided with circular openings having longitudinal grooves adapted to engage the longitudinal ribs. As a result the cover part may be easily turned between its first and its second positions using only one hand, the container part or the cover part being locked in the turning direction in relation to the storage unit.

The hook holder according to claim 16 is advantageous in that the container part and the cover part are prevented from leaving the storage unit.

The invention also relates to a hook holder set including a storage unit and a plurality of hook holders being retained in the circular openings of the storage unit.

BRIEF DESCRIPTION OF THE DRAWINGS

The invention will be explained in detail below by means of preferred embodiments illustrated on the attached drawings, in which FIG. 1 illustrates a hook holder according to the invention in its disassembled state and a treble hook;

FIG. 2 illustrates the hook holder according to FIG. 1 in its assembled state and with a hook being inserted therein;

BEST MODES FOR CARRYING OUT THE INVENTION

Figure 3:
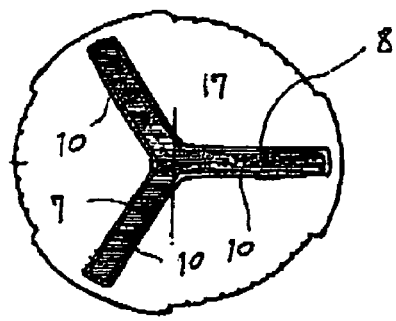
FIGS. 3, 4 and 5 illustrate a container part in a top view, a side view and a bottom view, respectively.

FIGS. 1 and 2 show a hook holder 1 according to the invention including a container part 2 and a cover part 3. The container part 2 is formed of a cylindrical body having a cavity being accessible from the top through an opening 8. The cover part 3 includes a circular upper wall 18 and a cylindrical side wall 15 extending downwardly from the periphery of the upper wall. The cover part 3 may be placed on the container part 2 and in its upper wall 19 it is provided with an opening 9 of a shape corresponding to the shape of the opening 8 in the container part 2. As illustrated, both the container opening 8 and the cover opening 9 are Y-shaped to allow insertion therethrough of the three curved end portions 6 of a treble hook 4, said end portions extending from the hook shank 5. By turning the cover part 3 in relation to the container part 2 about an axis of rotation being concentric with the central axis of the container part 2 and of the cover part 3, the cover opening 9 is rotationally displaced in relation to the container opening so that the curved end portions 6 of the hook are prevented from leaving the hook holder 1.

FIG. 3 is a top view of the container part. A substantially Y-shaped container opening is provided in the upper face 17 of the container part, said opening leaving three substantially equally long slots 10 extending radially from the central axis at an interspacing of about 120°. A cavity 7 extends down into the container part from the container opening and has a cross section in the plane of the paper corresponding to the container opening 8.

Figure 4:
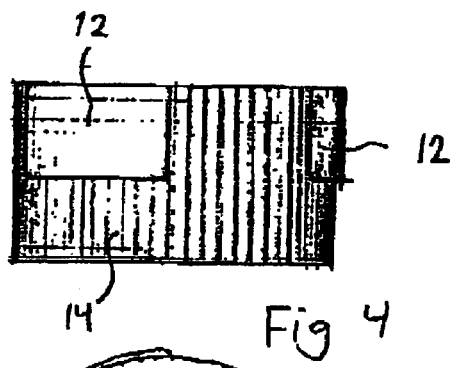

FIG. 4 is a side view of the container part. The outer face of the cylindrical wall 14 is provided with ribs for improved grip when the container part and the cover part are turned in relation to each other. Three rectangular projections 12 extend from the cylindrical wall 14, the function thereof being described below.

Figure 5:
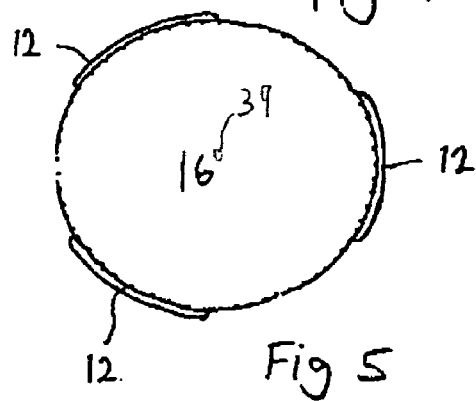

FIG. 5 illustrates the lower face 16 of the container part, and the three above projections 12 are clearly visible.

Figure 6:
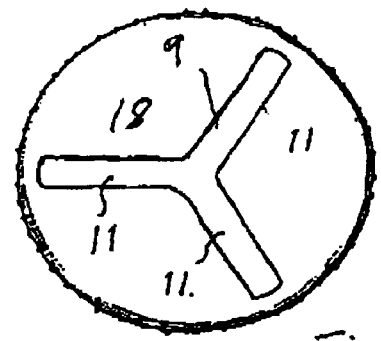
FIGS. 6, 7 and 8 illustrate a cover part in a top view, a side view and a bottom view, respectively.

FIG. 6 is a top view of the cover part 3 and it is evident that the cover opening 9—just as the container opening 7—is Y-shaped and provided with three slots 11 of substantially the same length extending radially outwards from the central axis at an interspacing of about 120°.

Figure 7:
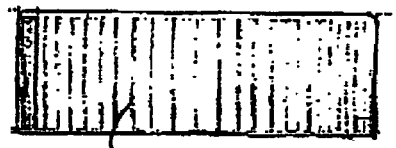

FIG. 7 is a side view of the cover part 3, the outer face of the cylindrical side wall 15 thereof being provided with ribs.

Figure 8:
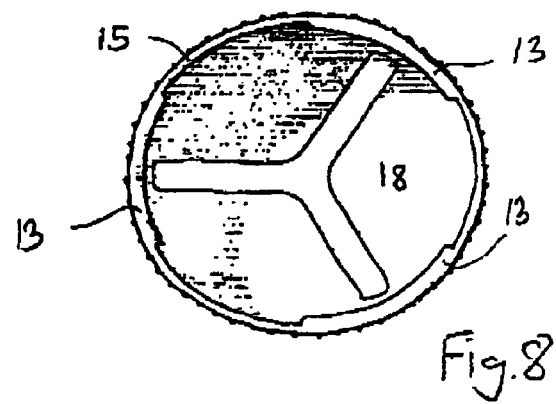

FIG. 8 is a bottom view of the cover part illustrating three projections 12 extending inwardly from the lower end of the cylindrical side wall 15. When the cover part 3 is arranged on the container part 2 in a first position, the projections 13 of the cover part are opposite the interspacing between the projections 12 of the container part. The cover part may thus be pulled axially off the container part and replaced by another cover part of a different colour, if desired. An angler may use cover parts of a specific colour for a specific size or type of fish hook. When the cover part 3 is turned about 60° from its first position to its second position, in which the cover opening 9 is rotationally displaced in relation to the container opening 8 and thus locks the hook in the hook holder, the projections 13 of the cover part are substantially positioned below the projections 12 of the container part such that the cover part cannot be removed from the container part.

Figure 9:
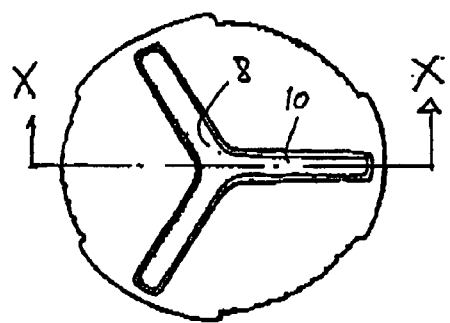
FIG. 9 is a top view of the container part.
Figure 10:
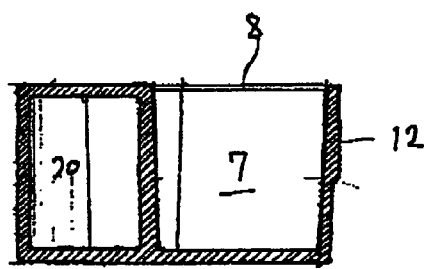
FIG. 10 is a sectional view through the container part along the line X—X in FIG. 9.

FIG. 9 is a top view of the container part, a sectional line X—X being shown diametrically through the central axis and one of the legs 10 of the container openings 8. FIG. 10 is a sectional view along the line X—X in FIG. 9. As shown, the cavity 7 extends from the container opening 8 to the bottom of the container part for accommodating the curved end portions of a hook. One or more additional cavities 20 provided in the areas of the container body, which are not accommodated in the cavity 7, may merely contain air to provide the hook holder with buoyancy, whereby the hook holder with hook and artificial bait may float in the water. Optionally the container body may be solid, except for the cavity 7 and be made from a material being lighter than water.

Figure 11:
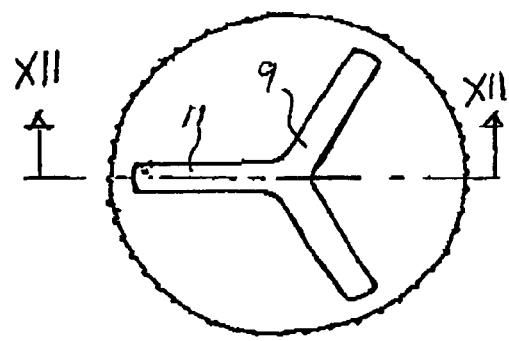
FIG. 11 is a top view of the cover part.

FIG. 11 is a top side view of the cover part, a sectional line XII—XII being shown through central axis and one of the legs 11 of the cover opening 9.

Figure 12:
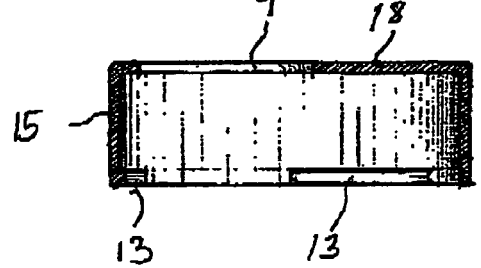
FIG. 12 is a sectional view through the cover part along the line XII—XII in FIG. 11.

FIG. 12 is a sectional view along the line XII—XII in FIG. 11. The container opening 9 in the upper wall 18 and the projections 13 extending inwardly from the cylindrical side wall are clearly visible.

Figure 13:
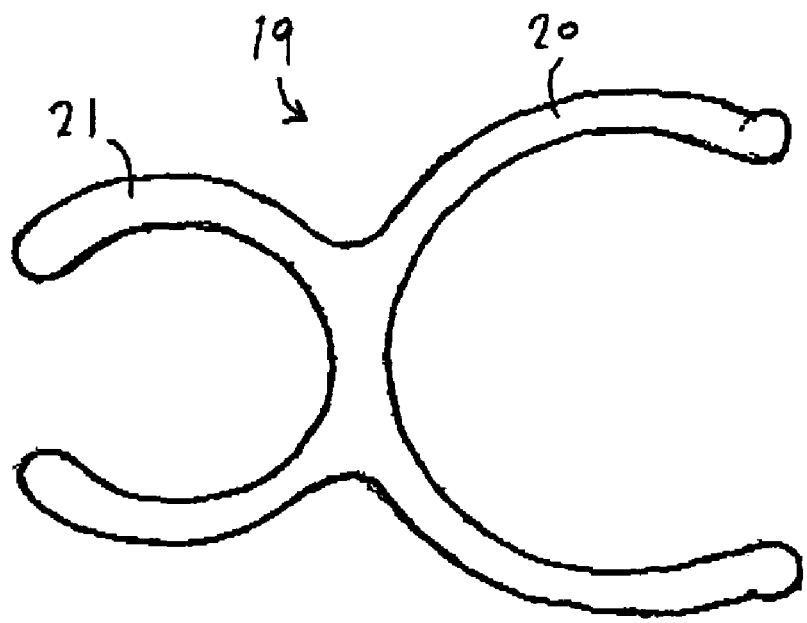
FIG. 13 is a top view of a mounting device for the hook holder.
Figure 14:
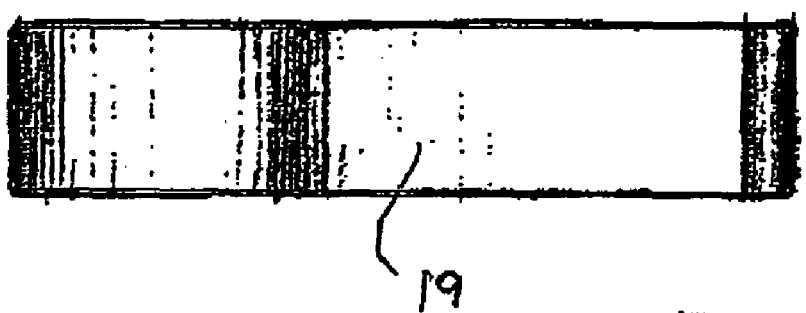
FIG. 14 is a side view of the mounting device.

FIG. 13 is a top view of a mounting device 19 which can be used for securing the hook holder to for instance a fishing rod. The mounting device 19 is substantially formed of two coherent, laterally reversed, resilient, C-shaped clamping means 21, 23, the openings of which facing away from each other. FIG. 14 is a side view of the mounting device 19.

Figure 15:
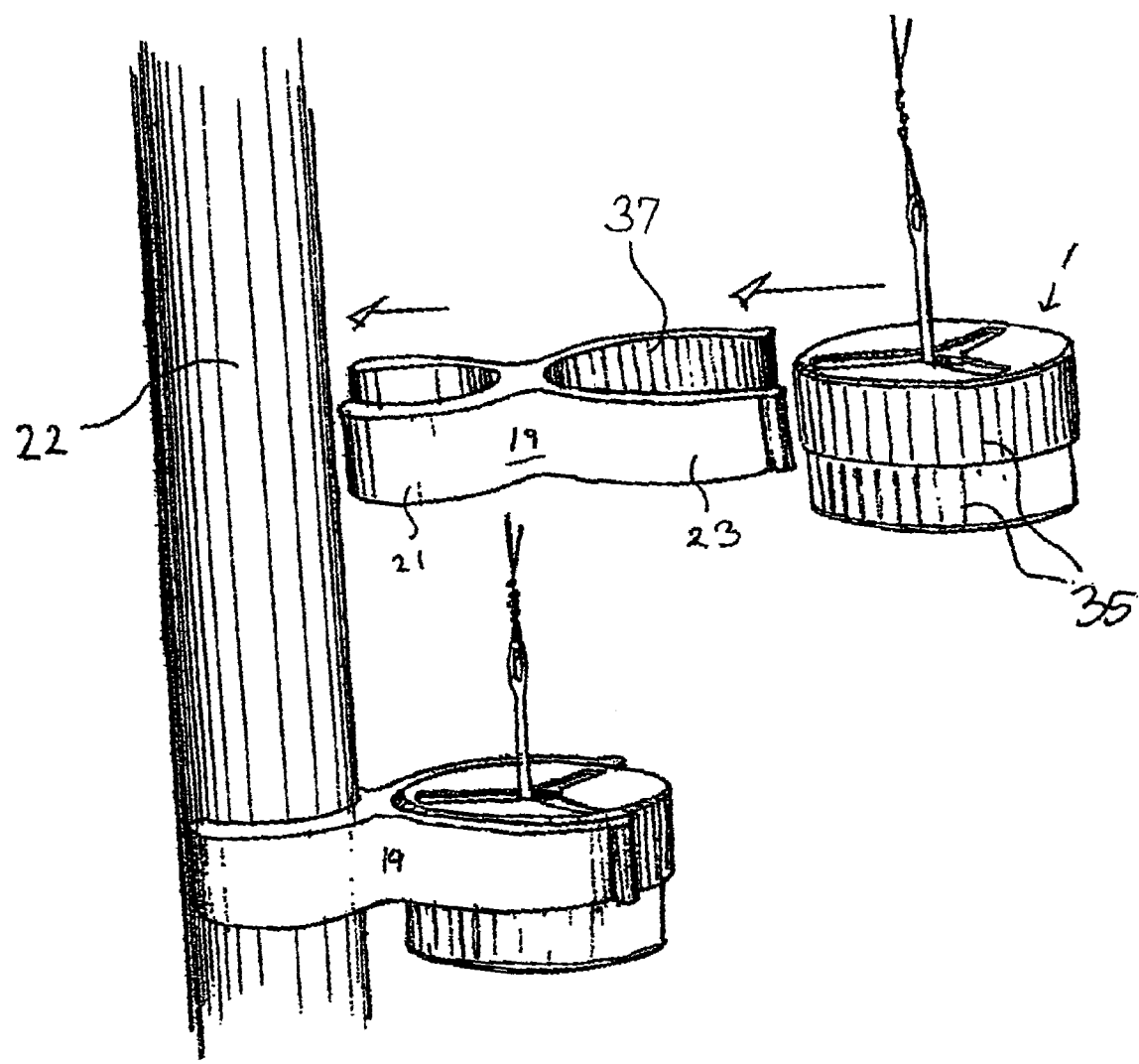
FIG. 15 is an illustration of how the mounting device can be used for mounted the hook holder on a fishing rod.

FIG. 15 shows how a hook holder 1 with an attached fishing hook may be secured to a fishing rod 22 by means of the mounting device 19. One of the mounting device's C-shaped clamping means 23 may thus be secured around the hook holder 1 and the other C-shaped clamping means 21 may be secured around the fishing rod 22. The angler is thus able to change from one fishing position to another without risking snagging himself oil the hook or entangling the line with branches and the like. The container part 2 and the cover part 3 are both provided with longitudinal ribs 35. The C-shaped clamping means 23 may be provided with corresponding grooves on its inner face. As a result the cover part 3 may be retained by means of the clamping means 23 during turning of the container part 2. The clamping means 23 may optionally be clamped on the container part 2, the cover part 3 being turned.

Figure 16:
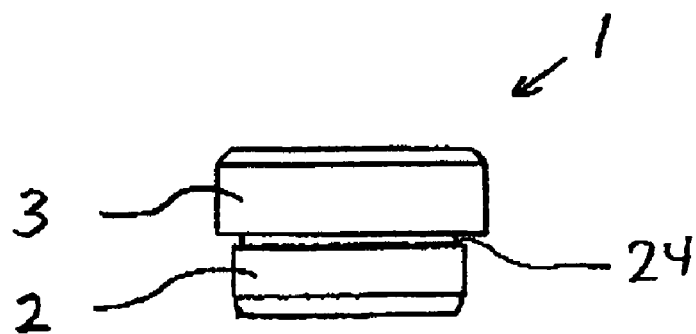
FIG. 16 shows an optional embodiment of a hook holder according to the invention.

FIG. 16 shows an embodiment, in which the hook holder in the container part 2 includes a peripherally extending groove 24.

Figure 17:
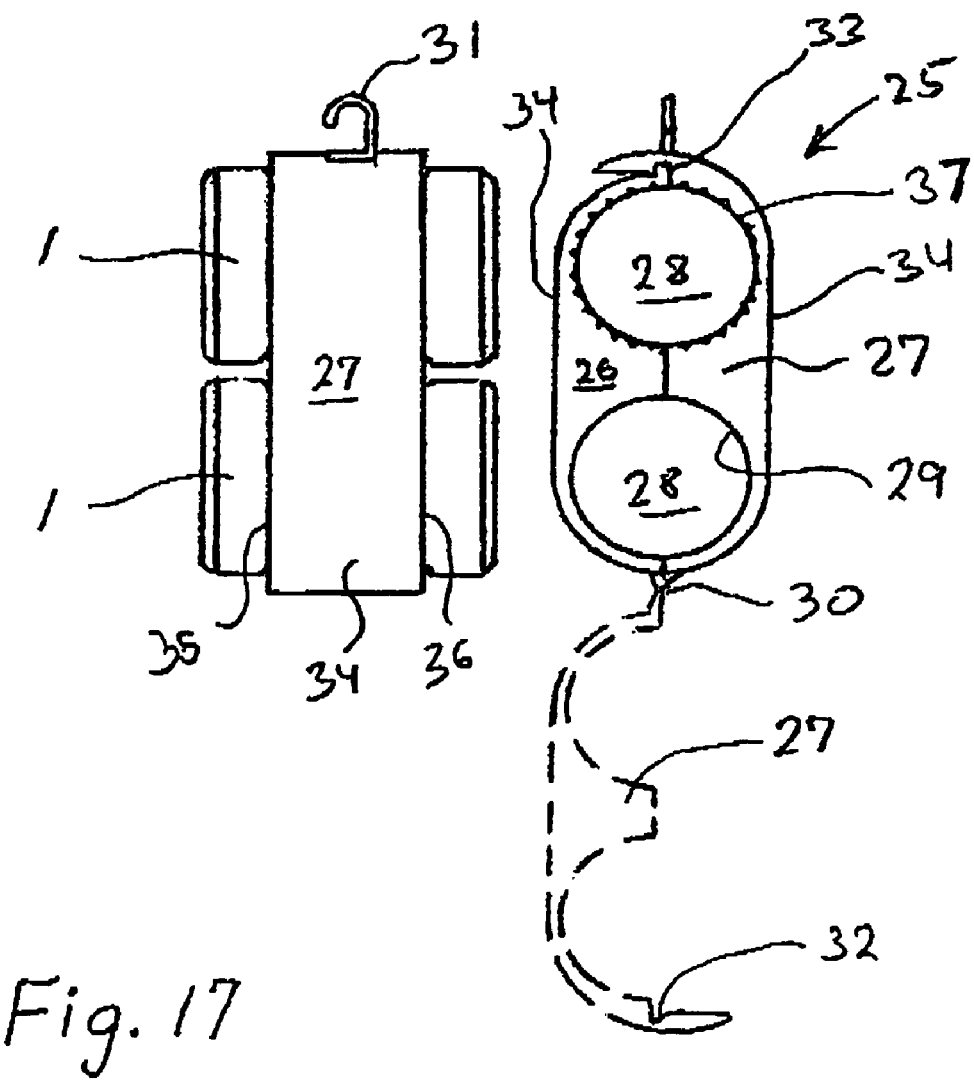
FIG. 17 shows a storage unit for retaining several book holders according to the invention.

FIG. 17 shows a storage unit 27 for storing several hook holders 1. The storage unit includes a first part 26 and a second part 27 being pivotal in relation to each other about a hinge 30, which inter alia may be a living hinge. The storage unit 27 may thus be rotated between an open position, in which the hook holders 1 may be withdrawn from and inserted into the storage unit 27, and a closed position, in which the hook holders 1 are retained in circular openings 28 defined by the first part 26 and the second part 27 of the storage unit 27. The first and second parts 26, 27 each includes a rear section 34 and two flanges 35, 36 projecting therefrom, each flange being provided with semi-circular notches. In the closed position of the storage unit, these semi-circular notches define the circular openings 28, whose edges may engage the circumferential groove 24 of the hook holder shown in FIG. 16. The storage unit shown in FIG. 17 may thus retain four hook holders 1, but may naturally also be adapted to retain any number of hook holders 1. The storage unit is here made of plastic and may be locked in its closed position by means of snap lock projection 33 provided on the first part 26 and which may snap into engagement with a snap lock notch 32 in the second part 27. A suspension hook 33 is provided to allow the storage unit 27 to hang on a rod.

The storage unit shown in FIG. 17 retains the hook holders on two sides, but may also be adapted to retain the hook holders 1 on only one side.

A storage unit may also be formed as a square cube with a longitudinal slot in one side wall, said slot having a width corresponding to the diameter of the circumferential groove 24. In such an embodiment a plurality of hook holders 1 may be inserted into the tube in abutment with to each other, a plug or another type of locking member being arranged such that the hook holders 1 are prevented from sliding out of the storage unit.

The hook holder 1 shown in FIG. 16 may also be combined with a mounting device corresponding substantially to the one shown in FIGS. 13–15, the C-shaped clamping means 23, however, being provided with an edge engaging the groove 24.

In FIG. 15 the C-shaped clamping means 23 retains the cover part 3 of the book holder 1. According to an optional embodiment the clamping means 23 retains the container part 2 being provided with grooves or ribs 37 extending parallel to the central axis of the container part 2 and engaging each other. As a result, only one hand is needed for opening or closing the hook holder.

The container part is preferably provided with a hole in the bottom. If this hole is placed in the centre, a thin pin 39 (shown end-on in FIG. 5) may be inserted through the centre of the container opening 8 and fixed in the hole in the bottom portion after one, two or three single hooks has/have been arranged with their curved end portions 6 in each section of the star-shaped cavity 3. A hook holder for treble hooks may also be used for retaining single hooks. The pin may optionally be provided with longitudinal grooves against which the shanks of the single hooks abut. This embodiment is particularly advantageous for storing snoods comprising several single hooks.

The container part 2 and the cover part 3 may be provided with snap locking means so that the container part 2 and the cover part 3 are locked in relation to each other in the first and/or second position of the hook holder. These snap locking means are formed so that a certain force is required to move the cover part 3 out of the first position and/or out the second position.

The individual components of the hook holder may be easily made of for instance injection moulded plastics. Optionally wood or metal may be used.

The container part and/or the cover part may be provided with perforations to allow moisture to evaporate, whereby problems with corrosion on the hooks are reduced.

Several hook holders may via their container parts be secured to a rail or for instance the railing of a boat.

The hook holder may also be designed to accommodate a double hook with two curved end portions and may thus have a longitudinal slot through the central axis in the cover part and a correspondingly shaped cavity in the container part. The hook holder may also be adapted for use with a single hook, a slot extending radially outwardly from the central axis in the cover part and in the container part.

The invention is not restricted to a hook holder for fishing hooks, but also covers other hook means, whose curved end portion is to be fixed or encapsulated. Accordingly, the hook holder may for instance be mounted on the lower face of a shelf so as to secure/hang a clothes hanger.

The invention claimed is:

1. Hook holder (1) for a hook (4) having a shank (5) and one or more curved end portions (6) extending from the shank, said hook holder including a container part (2) provided with a cavity (7) for accommodating the curved end portions of the hook, and a container opening (8) through which the curved end portions of the hook are insertable into the cavity, the hook holder further including retaining means to prevent the hook's curved end portions from unintentionally leaving the container part, characterized in that the retaining means include a cover part (3) provided with a cover opening (9) and mounted on the container part (2) so as to be movable between a first position, in which the container opening (8) is accessible through the cover opening (9) to allow insertion of the curved end portions (6) of the hook, and a second position, in which the container opening (8) is closed by the cover part (3) to allow the hook shank (5) to project out of the hook holder through the container opening and the cover opening, and the curved end portions of the hook are prevented from leaving the container part, wherein the container part (2) and the cover part (3) are cylindrical with a common central axis, and wherein the container opening (8) and the cover opening (9) are both Y-shaped and provided with three slots (10, 11) of substantially the same length and extending radially outwards at an interspacing of about 120°.

2. Hook holder according to claim 1, characterized in that the container opening (8) and the cover opening (9) each is provided with an elongate slot extending diametrically through the central axis.

3. Hook holder according to claim 1, characterised in that it includes a pin being securable in the centre of the container opening (8) and the cover opening (9), respectively.

4. Hook holder according to claim 1, characterized in that the cavity (7) is formed as a recess extending perpendicularly into the container part and having a cross section corresponding substantially to the shape of the container opening (8).

5. Hook holder according to claim 1, characterized in that the hook holder is made of a material or includes closed cavities allowing it and an artificial bait with a fish hook to float in water.

6. Hook holder according to claim 1, characterized in that the container part (2) or the cover part (3) is formed with a longitudinal central axis and provided with longitudinal ribs (35) extending parallel to the longitudinal central axis.

7. Hook holder according to claim 1, characterized in that the hook holder includes several container parts (2) and associated cover parts (3), and that the container parts (2) or the cover parts (3) are firmly interconnected.

8. Hook holder according to claim 1, characterized in that the hook holder includes a mounting device (19) having a hook holder fastening means (23) and a fishing rod fastening means (21) so that the hook holder may be secured to a fishing rod (22).

9. Hook holder according to claim 8, characterized in that the fastening means (21, 23) of the mounting device (19) are formed as substantially C-shaped flexible clamping means.

10. Hook holder according to claim 1, characterized in that the hook holder includes a peripherally extending groove (24) in the container part (2) or in the cover part (3).

11. Hook holder according to claim 1, wherein the hook (4) is a fish hook.

12. Hook holder (1) for a hook (4) having a shank (5) and one or more curved end portions (6) extending from the shank, said hook bolder including a container part (2) provided with a cavity (7) for accommodating the curved end portions of the hook, and a container opening (8) through which the curved end portions of the hook are insertable into the cavity, the hook holder further including retaining means to prevent the hook's curved end portions from unintentionally leaving the container part, characterised in that the retaining means include a cover part (3) provided with a cover opening (9) and mounted on the container part (2) so as to be movable between a first position, in which the container opening (8) is accessible through the cover opening (9) to allow insertion of the curved end portions (6) of the hook, and a second position, in which the container opening (8) is closed by the cover part (3) to allow the hook shank (5) to project out of the hook holder through the container opening and the cover opening, and the curved end portions of the hook are prevented from leaving the container part, wherein the container part (2) and the cover part (3) are cylindrical with a common central axis, and wherein on its cylindrical wall (4) the container part (2) includes outwardly extending projections (12) and the cover part (3) includes inwardly extending projections (13) at the lower end of the cylindrical wall (15), said latter projections being made to engage the lower face of the projections (14) of the container, when the cover part is moved from the first position to the second position.

13. Hook holder (1) for a hook (4) having a shank (5) and one or more curved end portions (6) extending from the shank, said hook holder including a container part (2) provided with a cavity (7) for accommodating the curved end portions of the hook, and a container opening (8) through which the curved end portions of the hook are insertable into the cavity, the hook holder further including retaining means to prevent the hook's curved end portions from unintentionally leaving the container part, characterized in that the retaining means include a cover part (3) provided with a cover opening (9) and mounted on the container part (2) so as to be movable between a first position, in which the container opening (8) is accessible through the cover opening (9) to allow insertion of the curved end portions (6) of the hook, and a second position, in which the container opening (8) is closed by the cover part (3) to allow the hook shank (5) to project out of the hook holder through the container opening and the cover opening, and the curved end portions of the hook are prevented from leaving the container part, wherein the container part (2) and the cover part (3) are cylindrical with a common central axis, wherein the hook holder includes a mounting device (19) having a hook holder fastening means (23) and a fishing rod fastening means (21) so that the hook holder may be secured to a fishing rod (22), the fastening means (21, 23) of the mounting extending parallel to the longitudinal central axis.

14. Hook holder (1) for a hook (4) having a shank (5) and one or more curved end portions (6) extending from the shank, said hook holder including a container part (2) provided with a cavity (7) for accommodating the curved end portions of the hook, and a container opening (8) through which the curved end portions of the hook are insertable into the cavity, the hook holder further including retaining means to prevent the hook's curved end portions from unintentionally leaving the container part, characterized in that the retaining means include a cover part (3) provided with a cover opening (9) and mounted on the container part (2) so as to be movable between a first position, in which the container opening (8) is accessible through the cover opening (9) to allow insertion of the curved end portions (6) of the hook, and a second position, in which the container opening (8) is closed by the cover part (3) to allow the hook shank (5) to project out of the hook holder through the container opening and the cover opening, and the curved end portions of the hook are prevented from leaving the container part, wherein the container part (2) and the cover part (3) are cylindrical with a common central axis, the cover part 92) or the container part (3) is provided with longitudinal ribs (35) extending parallel to said central axis, and wherein the hook holder comprises a storage unit (27) provided with circular openings (28) having longitudinal grooves adapted to engage the longitudinal ribs (35).

15. Hook holder according to claim 14, characterized in that each openings (28) of the storage unit (27) includes a circular edge portion (29) adapted to engage a peripherally extending groove (24) in the container part (2) or in the cover part (3).

16. Hook holder according to claim 14, wherein a plurality of hook holders (1) are retained in the circular openings (28) of the storage unit (27).

* * * * *